United States Patent [19]

Gillette et al.

[11] 4,257,354

[45] Mar. 24, 1981

[54] MEANS FOR ADJUSTING HEIGHTS OF NIPPLE WATERERS

[75] Inventors: John E. Gillette, Kalona; Mark S. Mittelberg, Iowa City, both of Iowa

[73] Assignee: Confinement Specialists, Inc., Kalona, Iowa

[21] Appl. No.: 50,766

[22] Filed: Jun. 21, 1979

[51] Int. Cl.³ .............................................. A01K 7/06
[52] U.S. Cl. ..................... 119/72.5; 119/18; 119/75; 285/38
[58] Field of Search ............. 119/72.5, 75, 18, 72; 285/38, 272

[56] References Cited

U.S. PATENT DOCUMENTS

| | | | |
|---|---|---|---|
| 2,749,882 | 6/1956 | Buther | 119/75 |
| 4,173,948 | 11/1979 | Austin | 119/75 |

Primary Examiner—Jay N. Eskovitz
Attorney, Agent, or Firm—Zarley, McKee, Thomte, Voorhees & Sease

[57] ABSTRACT

A means for adjusting the heights of animal waterers in a multi-cage livestock confinement system includes an elongated water pipe rotatably mounted along an elongated partition which closes one side of a plurality of longitudinally positioned livestock cages. The water pipe is connected to a source of water under pressure and a watering valve in each cage is attached to the water pipe so that the elevations of the watering valves are adjusted in response to rotation of the water pipe about its longitudinal axis. A lever may be extended from the water pipe at the same attitude as the watering valves for rotating the watering pipe and indicating the elevation of the watering valves.

10 Claims, 4 Drawing Figures

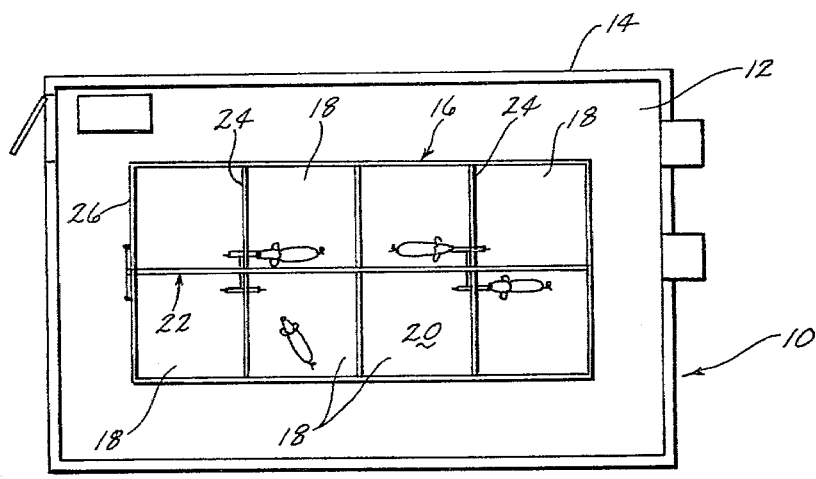
Fig. 1
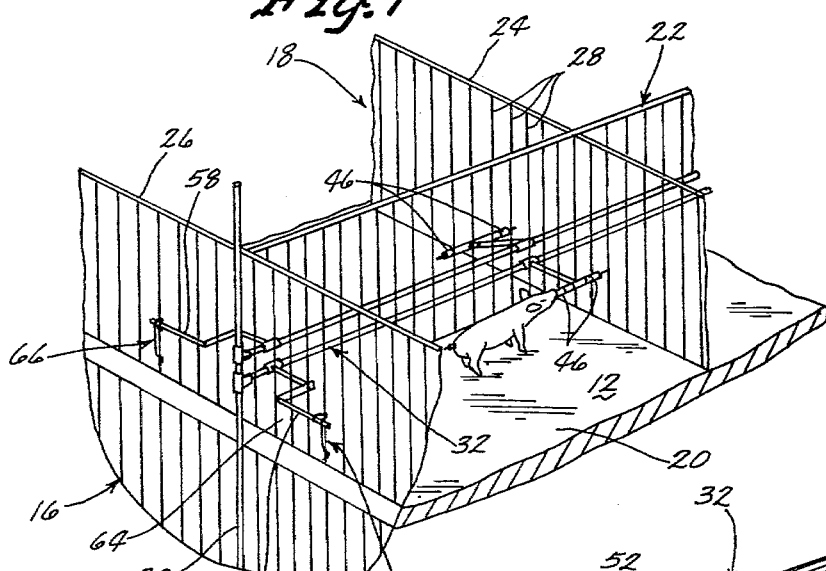
Fig. 2
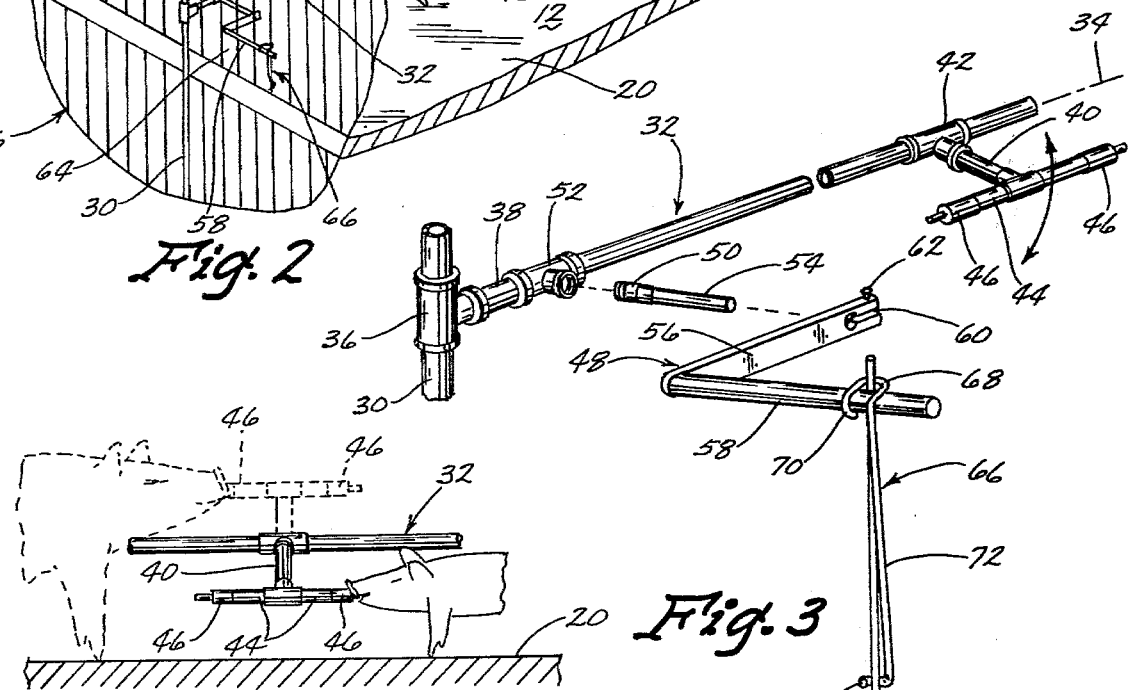
Fig. 3
Fig. 4

MEANS FOR ADJUSTING HEIGHTS OF NIPPLE WATERERS

BACKGROUND OF THE INVENTION

This invention relates generally to animal watering systems for livestock confinement buildings and more particularly to a means for adjusting the heights of animal waterers.

Cage rearing of certain livestock such as hogs has become increasingly popular due to such advantages as improved production efficiency, the production of more uniform pigs and overall economy. In addition, cage rearing has become a proven management tool for the critical post-weaning.

In a multi-cage livestock confinement system, for example, once the young pigs are weaned, they are moved to a nursery unit wherein several young pigs are confined within each cage. Each cage is provided with a feeder apparatus and a continuous source of water such as a nipple waterer. It is a problem however to properly position the nipple waterers for access by the young pigs since the pigs practically double in size during their short stay in the nursery unit. A young pig may enter the nursery unit weighing twenty pounds for example, and be removed to the hog finishing building just three to five weeks later weighing forty pounds or more and of substantially increased size. There is a need therefore for a means for adjusting the heights of animal waterers to accommodate animals of varying size.

Accordingly, it is a primary object of the invention to provide a means for adjusting the heights of animal waterers in a multi-cage livestock confinement system.

A further object is to provide an animal waterer adjustment means which provides for the adjustment of several waterers in unison.

Another object is to provide an animal waterer adjustment means which may be operated from a position exteriorly of the animal confinement cages.

Another object is to provide an animal waterer adjustment means which may be releasably locked at selected heights therefor.

Finally, another object is to provide an animal waterer adjustment means which is simple in construction, durable in use and efficient in operation.

SUMMARY OF THE INVENTION

The means for adjusting the heights of animal waterers in a multi-cage livestock confinement system, according to the present invention, includes a plurality of longitudinally positioned livestock cages wherein an elongated partition closes one side of each of the cages and at least one dividing partition extends away from the elongated partition to divide one cage from another. An elongated water pipe which supplies water to each of the cages is mounted for rotation about its longitudinal axis on the elongated partition. The water pipe is connected to a source of water under pressure and a watering valve in each cage is attached to the water pipe so that the elevation of the watering valves are adjusted in response to rotation of the water pipe about its longitudinal axis. A single pivot pipe may extend outwardly from the water pipe at a position adjacent a dividing partition so that a pair of watering valves positioned in opposing relation on the outer end of the pivot pipe may provide water to the cages on both sides of the dividing partition. The water pipe may be rotated by a lever which extends therefrom at the same attitude as the pivot pipes so that it doubles as an indicator of the height of the animal waterers. The lever extends exteriorly of the cages for convenient access and may be releasably locked in selected positions as required to accommodate animals of a particular size.

BRIEF DESCRIPTION OF THE DRAWINGS

FIG. 1 is a top plan view of a livestock confinement building with the roof structure removed to expose the animal confinement cages therein;

FIG. 2 is an enlarged perspective view of a portion of a multi-cage livestock confinement system;

FIG. 3 is an enlarged partially exploded and foreshortened perspective view of the adjustment means for the nipple waterers; and FIG. 4 is a side elevational view showing the nipple waterers in alternate adjusted positions therefor.

DESCRIPTION OF THE PREFERRED EMBODIMENT

The means of the present invention for adjusting the heights of animal waterers is adapted for use in a multi-cage livestock confinement system. The system shown in FIG. 1 includes a confinement building 10 having a floor surface 12, a side wall enclosure 14 and a roof structure (not shown). A multi-level cage facility 16, which is housed within the building pen, includes stacked double rows of livestock cages 18. Each row includes four longitudinally positioned livestock cages as shown, but in other embodiments, the number of cages per row may vary and the rows may stand alone or be arranged in pairs as desired.

Each row of cages 18 is supported on a floor surface 20 and includes an elongated partition 22 which closes one side of each cage and at least one dividing partition 24 which extends away from the elongated partition 22 to divide one cage 18 from another. End wall 26 closes the side of the end cage opposite the dividing partition 24. The elongated partition 22, dividing partition 24 and end wall 26 may be conveniently constructed of spaced apart upright bars 28 although any other construction that provides vertically extended openings to accommodate the adjustment means described below may also be suitable.

Referring to FIGS. 2 and 3, a main water supply line 30 is positioned in upright relation at one end of the elongated partition 22. An elongated water pipe 32 extends along one side of the elongated partition 22 and is supported for rotation about its own longitudinal axis, indicated at 34. Water pipe 32 is connected to the main water supply line 30 by a combination T-fitting 36 and a conventional swivel coupling 38 to provide for rotation of water pipe 32 while maintaining the integrity of the water pipe plumbing system. The opposite end of water pipe 32 (not shown) is plugged and may be rotatably supported by any suitable means such as a bearing bracket secured to the elongated partition 22.

A plurality of pivot pipes 40 are connected to the water pipe 32 at longitudinally spaced apart positions by T-fittings 42. A longitudinally extended pipe section 44 is connected in fluid communication with the free end of pivot pipe 40 for supporting a pair of nipple waterers 46 on opposite ends thereof and in opposing relation to one another. Note that each pivot pipe 40 is longitudinally positioned adjacent a dividing partition 24 such that one of the nipple waterers 46 thereon protrudes through a pair of adjacent bars 28 of the dividing partition 24 to supply water to the cage on the opposite side of the dividing partition 24.

To rotate water pipe 32, a lever 48 having a pipe plug 50 on one end thereof is connected to the water pipe 32 by means of a T-fitting 52. Lever 48 includes a first outwardly extended portion 54, a second longitudinally extended portion 56 and a third outwardly extended handle portion 58. In FIG. 3 it is seen that second portion 56 includes a split end portion at 60 adapted to be rotatably received onto the free end of first portion 56 and to be clamped thereon by a machine bolt 62. The second portion 56 is operative to longitudinally displace the handle portion 58 exteriorly of the cages 18. The second portion 56 also extends through a vertically extended opening 64 between a pair of the bars 28 of end wall 26. Handle 58 is thus rotatably moveable in a vertical plane adjacent end wall 26.

A spring clamp 66 (FIG. 3) is provided for releasably locking the handle 58 in a selected pivoted position. Spring clamp 66 includes a horizontal U-shaped portion 68 with opposite ends thereof connected respectively to a generally vertical U-shaped portion 70 and a downwardy extended leg 72 having a bar engaging offset portion 74 at the lower end thereof. With horizontal portion 68 engaged about the rearward side of bar 28 and vertical portion 70 and leg 72 engaged around the forward side of handle 58, the leg 72 may be pushed rearwardly to hook the offset portion 74 around the rearward side of bar 28 to releasably lock the handle thereto as shown in FIG. 3.

In operation, water is supplied to each of the nipple waterers 46 through the main water supply line 30, elongated pipe 32 and the respective pivot pipe 40 and pipe section 44. All of the pivot pipes 40 along a single water pipe 32 are preferrably disposed at the same attitude relative to the pipe so that the nipple waterers thereon are all disposed at the same height. Likewise, lever 48 is preferrably disposed at the same attitude as the waterers so as to provide an indication of the height of the waterers. Because handle portion 58 may be extended outwardly of water pipe 32 further than the nipple waterers 46, the connection between the first and second portions 54 and 56 of lever 48 should be adjusted so that the handle 58 is disposed at the same height as the nipple waterers 46.

Referring to FIG. 4, the nipple waterers may be initially adjusted to the solid line position at an initial height of eleven inches, for example. As the pig grows to its dotted line size as shown in FIG. 4, lever 48 is periodically rotated successively upwardly until the nipple waterers are eventually positioned in the raised dotted line position shown in FIG. 4 at a height of eighteen inches above the floor surface 20, for example. Accordingly, the nipple waterers 46 are adjustable in height so as to be operatively accessible to the young growing pigs throughout the duration of their development in the nursing unit.

Accordingly, there has been shown and described a means for adjusting the heights of animal waterers which accomplishes at least all of the stated objects.

We claim:

1. Means for adjusting the heights of animal waterers in a multi-cage livestock confinement system, comprising, a plurality of longitudinally positioned livestock cages, an elongated partiton closing one side of each of said cages, at least one dividing partition extending away from said elongated partition to divide one cage from another, an elongated waterpipe having a longitudinal axis rotatably mounted on said elongated partition and being in communication with each of said cages, a watering valve in each of said cages attached to said waterpipe, means for connecting said waterpipe to a source of water under pressure, and means for rotating said waterpipe about its longitudinal axis to move said watering valves to different elevations.

2. The adjustment of claim 1 further comprising a plurality of pivot pipes connected to said elongated waterpipe and extended outwardly therefrom, each pivot pipe being in fluid communication with said waterpipe and a respective watering valve for supplying water to said valve.

3. The adjustment means of claim 2 wherein a pair of watering valves are connected to one pivot pipe and disposed in opposing relation to one another.

4. The adjustment means of claim 3 wherein said dividing partition has an opening therein and said pivot pipe is positioned adjacent one side of said dividing partition such that one of the watering valves connected to said pivot pipe protrudes through said opening, thereby to supply water to a cage on the opposite side of said dividing partition.

5. The adjustment means of claim 1 wherein said means for connecting said waterpipe to a source of water under pressure comprises a swivel coupling operatively connected to one end of said elongated waterpipe and to said source of water whereby said waterpipe is rotatably connected to said source of water.

6. The adjustment means of claim 1 wherein the means for rotating said water pipe comprises a lever operatively connected thereto and extended outwardly therefrom.

7. The adjustment means of claim 6 wherein said lever is connected to said waterpipe at the same attitude as said valve connector pipes whereby said lever provides an indication of the elevation of said watering valves.

8. The adjustment means of claim 7 further comprising means for releasably locking said lever in selected rotational positions therefor.

9. The adjustment means of claim 8 further comprising an end wall extended outwardly from one end of said elongated partition, said end wall comprising a plurality of generally parallel spaced apart bars, and said lever including a handle positioned adjacent said end wall.

10. The adjustment means of claim 9 wherein said means for releasably locking said lever comprises a spring clamp engagable with said lever and at least one bar of said end wall.

* * * * *